United States Patent
Zhang et al.

(10) Patent No.: US 12,284,360 B2
(45) Date of Patent: Apr. 22, 2025

(54) PERFORMANCE OPTIMIZATION OF PRE-PROCESSOR USING VIDEO PROXY CODEC

(71) Applicants: Disney Enterprises, Inc., Burbank, CA (US); ETH Zürich (Eidgenössische Technische Hochschule Zürich), Zürich (CH)

(72) Inventors: Yang Zhang, Dubendorf (CH); Mingyang Song, Zürich (CH); Christopher Richard Schroers, Uster (CH); Tunc Ozan Aydin, Zürich (CH); Yuanyi Xue, Alameda, CA (US); Scott Labrozzi, Cary, NC (US)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 53 days.

(21) Appl. No.: 18/490,613

(22) Filed: Oct. 19, 2023

(65) Prior Publication Data
US 2024/0430440 A1    Dec. 26, 2024

Related U.S. Application Data

(60) Provisional application No. 63/509,129, filed on Jun. 20, 2023.

(51) Int. Cl.
*H04N 7/12* (2006.01)
*H04N 19/146* (2014.01)
*H04N 19/159* (2014.01)

(52) U.S. Cl.
CPC ......... *H04N 19/146* (2014.11); *H04N 19/159* (2014.11)

(58) Field of Classification Search
CPC ...................................... H04N 19/146
See application file for complete search history.

(56) References Cited

PUBLICATIONS

A. Chadha and Y. Andreopoulos, "Deep Perceptual Preprocessing for Video Coding," 2021 IEEE/CVF Conference on Computer Vision and Pattern Recognition (CVPR), Nashville, TN, USA, 2021, 10 pages, doi: 10.1109/CVPR46437.2021.01461.
Anurag Ranjan, "Optical Flow Estimation using a Spatial Pyramid Network," arXiv:1611.00850v2 [cs.CV] 21, Nov. 2016, 10 pages.

(Continued)

*Primary Examiner* — Y Lee
(74) *Attorney, Agent, or Firm* — Kwan & Olynick LLP

(57) ABSTRACT

In some embodiments, a method trains a first parameter of a differentiable proxy codec to encode source content based on a first loss between first compressed source content and second compressed source content that is output by a target codec. A pre-processor pre-processes a source image to output a pre-processed source image, the pre-processing being based on a second parameter. The differentiable proxy codec encodes the pre-processed source image into a compressed pre-processed source image based on the first parameter. The method determines a second loss between the source image and the compressed pre-processed source image and determines an adjustment to the first parameter based on the second loss. The adjustment is used to adjust the second parameter of the pre-processor based on the second loss.

19 Claims, 11 Drawing Sheets

(56) References Cited

PUBLICATIONS

Berivan Isik et al., "Sandwiched Video Compression: Efficiently Extending the Reach Ofstandard Codecs With Neural Wrappers," arXiv:2303.11473v2 [eess.IV] Jul. 5, 2023, 6 pages.

Chenyang Qi, et la., "Real-time 6K Image Rescaling with Rate-distortion Optimization," arXiv:2304.01064v2 [cs.CV] May 19, 2023, 16 pages.

Chris Montgomery et al. Xiph. org video test media (derf's collection), the xiph open source community, 1994. Online, https://media.xiph.org/video/derf, 3(5), 2021, 18 pages.

David Minnen, et al., "Joint Autoregressive and Hierarchical Priors for Learned Image Compression," arXiv:1809.02736v1 [cs.CV] Sep. 8, 2018, 22 pages.

Eirikur Agustsson, et al., "NTIRE 2017 Challenge on Single Image Super-Resolution: Dataset and Study," http://www.vision.ee.ethz.ch/ntire17/, 10 pages, 2017.

Ilya Loshchilov & Frank Hutter, "SGDR: Stochastic Gradient Descent With Warm Restarts," arXiv:1608.03983v5 [cs.LG] May 3, 2017, 16 pages.

Jan P. Klopp, et al., "How to Exploit the Transferability of Learned Image Compression to Conventional Codecs," arXiv:2012.01874v2 [eess.IV] Mar. 7, 2021, 10 pages.

Jean Bégaint, et al., "CompressAI: a PyTorch library and evaluation platform for end-to-end compression research," arXiv:2011.03029v1 [cs.CV] Nov. 5, 2020, 19 pages.

Jeya Maria Jose Valanarasu, et al., "ReBotNet: Fast Real-time Video Enhancement," arXiv:2303.13504v1 [cs.CV] Mar. 23, 2023, 15 pages.

Jingyun Liang, "SwinIR: Image Restoration Using Swin Transformer," arXiv:2108.10257v1 [eess.IV] Aug. 23, 2021, 12 pages.

Johannes Balle, et al., "End-To-End Optimized Image Compression," arXiv:1611.01704v3 [cs.CV] Mar. 3, 2017, 27 pages.

Johannes Ballé, et al., "Variational Image Compressionwith a Scale Hyperprior," arXiv:1802.01436v2 [eess.IV] May 1, 2018, 23 pages.

Kai Zhang, "Designing a Practical Degradation Model for Deep Blind Image Super-Resolution," arXiv:2103.14006v2 [eess.IV] Sep. 30, 2021, 10 pages.

Kelvin C.K. Chan, "Investigating Tradeoffs in Real-World Video Super-Resolution," arXiv:2111.12704v1 [cs.CV] Nov. 24, 2021, 14 pages.

Liangyu Chen, "Simple Baselines for Image Restoration," arXiv:2204.04676v4 [cs.CV] Aug. 1, 2022, 21 pages.

O. G. Guleryuz et al., "Sandwiched Image Compression: Wrapping Neural Networks Around a Standard Codec," 2021 IEEE International Conference on Image Processing (ICIP), Anchorage, AK, USA, 2021, 5 pages, doi: 10.1109/ICIP42928.2021.9506256.

Yannick Strumpler, et al., "Learning to Improve Image Compressionwithout Changing the Standard Decoder," arXiv:2009.12927v3 [eess.IV] Oct. 23, 2020, 17 pages.

Zhi Li, "Toward A Practical Perceptual Video QualityMetric," Netflix TechBlog, Jun. 6, 2016, 20 pages.

PERFORMANCE OPTIMIZATION OF PRE-PROCESSOR USING VIDEO PROXY CODEC

CROSS REFERENCE TO RELATED APPLICATIONS

Pursuant to 35 U.S.C. § 119(e), this application is entitled to and claims the benefit of the filing date of U.S. Provisional App. No. 63/509,129 filed Jun. 20, 2023, entitled "Optimizing Rate-distortion Performance through Learning Pre-processing with a Video Proxy-codec", the content of which is incorporated herein by reference in its entirety for all purposes.

BACKGROUND

The delivery of content, such as video, audio, and image content, through a network continues to increase. The compression of the content before delivery is important to reduce the amount of data that is transmitted through the network. An encoder/decoder (codec) may encode the content for delivery to a client, which then uses a codec to decode the content. The compression may be lossy and may introduce artifacts, which may be visually undesirable. New standards for codecs may be developed that may improve the performance of codecs. However, the new standards take many years to develop. In the meantime, the existing codecs are used to compress content.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
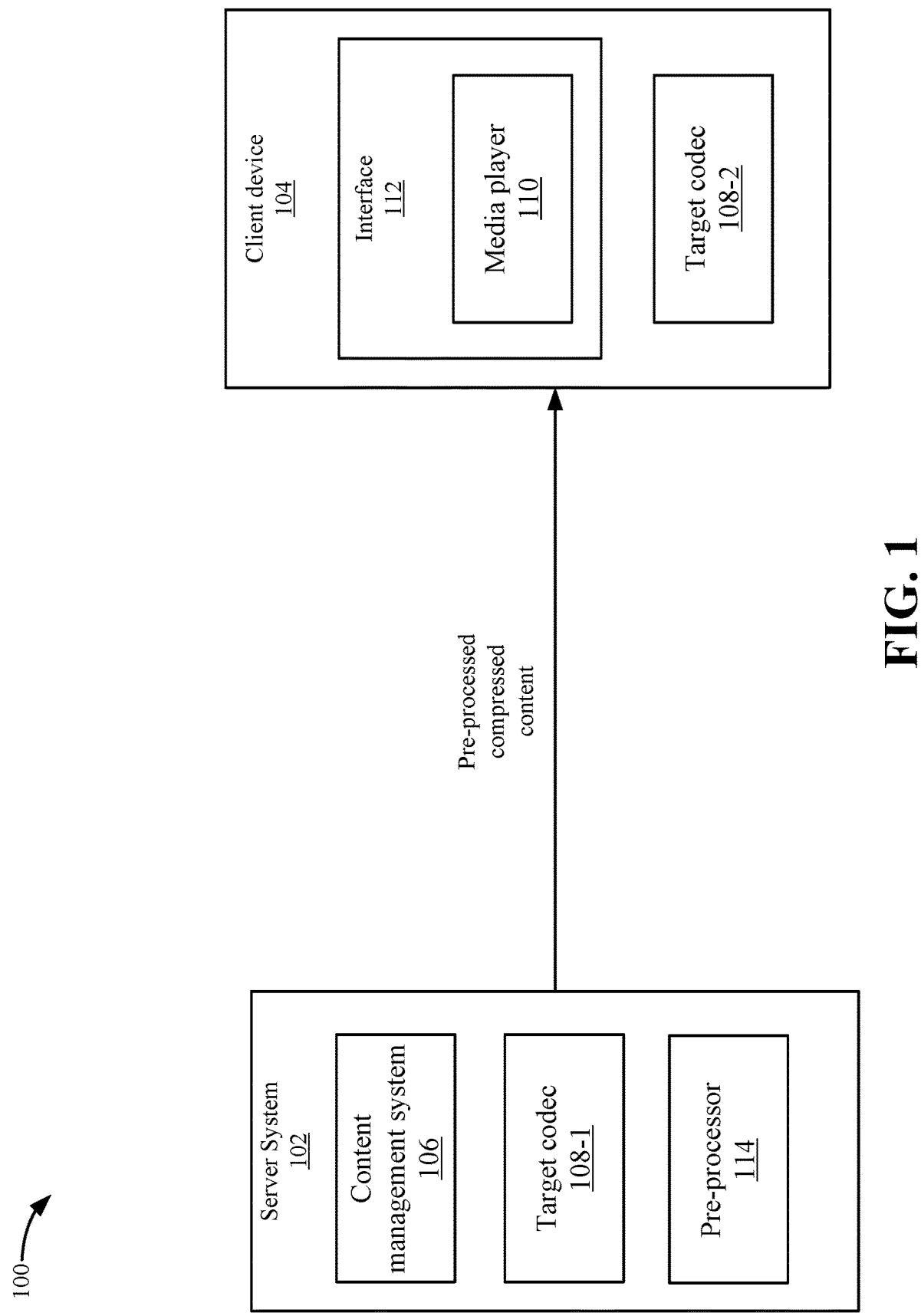
FIG. 1 depicts a simplified system for processing content according to some embodiments.

Described herein are techniques for a video processing system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system improves the quality of compression of source content using a pre-processor. In some embodiments, the system may pre-process the source content without changing the decoding procedure on the client device. The pre-processor may pre-process the source content to improve the decoded content at the client device. For example, the pre-processing may compensate for distortion, such as compression artifacts, that may have resulted in the decoded content when using a target codec. Distortion may be differences in the decoded content compared to the original source content. The pre-processing may achieve better quality performance, such as a rate distortion performance may be improved using the pre-processed source content compared to not using the pre-processed source content. In operation, the pre-processor may be trained to pre-process the source content to alleviate a quality issue that would have been experienced when using a target codec while keeping the bitrate around the bitrate that would have been output by the target codec.

To train the pre-processor, a differentiable proxy codec is used that may be trained to operate similarly to the target codec. That is, the proxy codec may output compressed content that is similar to the distortion and bitrate of compressed content output by the target codec. The proxy codec is differentiable to allow the pre-processor to be trained. The proxy codec includes parameters that can be trained to output compressed content that is similar to a target codec. Then, the parameters of the proxy codec may be fixed to train the pre-processor. In the training of the pre-processor, the system can pre-process source content and encode the pre-processed source content with the proxy codec to generate pre-processed compressed content. The system may compute a loss between the source content and the compressed pre-processed content. The loss is used to estimate changes in parameters to the proxy codec that would minimize the loss. The changes that can be determined from parameters of the proxy codec make the proxy codec differentiable compared to the target codec, which may not have parameters that are differentiable. As noted above, the parameters of the proxy codec are frozen during the training of the pre-processor. However, the adjustments to the parameters may be used to determine a gradient in changes to the parameters. The gradient for the adjustments may be back-propagated to the pre-processor, which uses the gradient to train the parameters of the pre-processor to output pre-processed video that may minimize the loss. Once trained, the pre-processor and the target codec may be used to compress content. The compressed pre-processed content may have a higher quality than source content that is not pre-processed.

Using the pre-processor provides many advantages. For example, a new standard for codecs may take many years to develop. However, using a trained pre-processor may improve the quality of compressed content that is output by a target codec that is using an existing standard. Also, the use of a differentiable proxy codec improves the training of the pre-processor. If the target codec is used, then a gradient could not be back propagated to the pre-processor. Without the differentiable proxy codec, the output the of pre-processed compressed content cannot be used in training the pre-processor.

System

FIG. 1 depicts a simplified system 100 for processing content according to some embodiments. System 100 includes a server system 102 and a client device 104. Although a single instance of server system 102 and client device 104 are shown, multiple instances of server system 102 and client device 104 may be appreciated. For example, multiple client devices 104 may be requesting content from a single server system 102 or multiple server systems 102.

Server system 102 includes a content management system 106 that may facilitate the delivery of content to client device 104. For example, content management system 106 may communicate with multiple content delivery networks (not shown) to have content delivered to multiple client devices 104. A content delivery network includes servers that can deliver content to client device 104. In some embodiments, the content delivery network delivers segments of video to client device 104. The segments may be a portion of the video, such as six seconds of the video. A video may be encoded in multiple profiles that correspond to different levels, which may be different levels of bitrates or quality (e.g., resolution). Client device 104 may request a segment of video from one of the profile levels based on current network conditions. For example, client device 104 may use an adaptive bitrate algorithm to select the profile for the video based on the estimated current available bandwidth and other network conditions.

Client device 104 may include a mobile phone, smartphone, set top box, television, living room device, tablet device, or other computing device. Client device 104 may include a media player 110 that is displayed on an interface 112. Media player 110 or client device 104 may request content from the content delivery network. In some embodiments, the content may be video, audio, images, or other content. Media player 110 may use an adaptive bitrate system to select a profile when requesting segments of the content. In response, the content delivery network may deliver (e.g., stream) the segments in the requested profiles to client device 104 for playback using media player 110.

A target codec 108-1 may encode source content, which may be video, audio, images, and other types of content. Target codec 108-1 may encode source content based on a standard that is used for encoding and decoding source content.

A pre-processor 114 may pre-process source content to output pre-processed source content. Target codec 108-1 may receive the pre-processed source content and compress (e.g., encode) the pre-processed source content. The pre-processed compressed source content may be sent to client device 104, such as via a content delivery network. Then, target codec 108-2 may decode the pre-processed compressed source content. The decoded content may be displayed in media player 110.

The decoded content may have an improved quality compared to decoded content that did not use the pre-processing. For example, pre-processor 114 may include alterations, such as patterns, in the source content to alleviate artifacts that may have occurred in the compressed source video without pre-processing while keeping the bitrate around the original bitrate that may have occurred without the pre-processing. The preprocessing tries to compensate for the artifacts introduced target codec 108-1 by changing the inputs to target codec 108-1 rather than improving the standard used by target codec 108-1. In some embodiments, the alterations may include additional signals to the original signals, such as noise, repetitive patterns, and signals that can cause the decoded original signals of the source content to look visual better. The magnitude of the added signals may be low to make sure they do not substantially change what the original signals are expressing. Moreover, the added values are dependent on the original signal of the source content.

Figure 2:
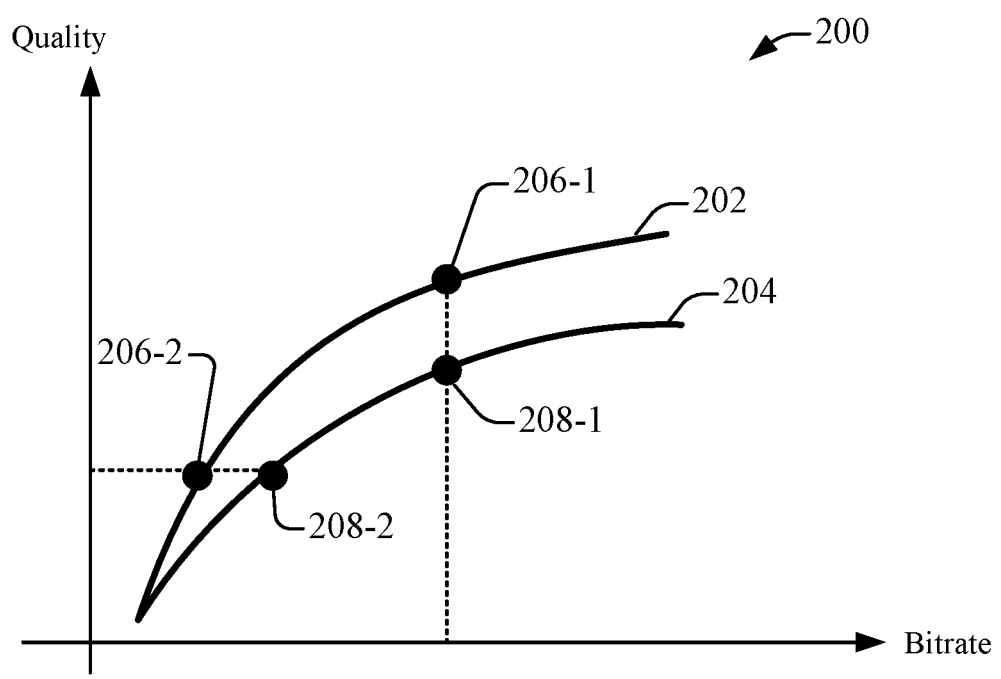
FIG. 2 depicts a graph of rate distortion curve that may be used to evaluate the performance of codecs according to some embodiments.

FIG. 2 depicts a graph 200 of rate distortion curve that may be used to evaluate the performance of codecs according to some embodiments. The Y-axis may be a quality metric of the compressed source content and the X-axis may be bitrate. The quality metric may be different metrics, such as peak signal to noise ratio (PNSR), Structural Similarity Index (SSIM), Video Multimethod Assessment Fusion, (VMAF) etc. Curves in graph 200 indicate a value of the quality metric of compressed source content for a corresponding bitrate. When comparing two curves, the curve with the higher quality metric value under the same bitrate or the curve with the lower bitrate under the same quality metric value may be considered better.

In some embodiments, curve 202 may represent the rate distortion curve for a codec that uses pre-processor 114 and curve 204 may represent the rate distortion curve for a codec that does not use pre-processor 114. A point 206-1 on curve 202 and a point 208-1 on curve 204 have the same bitrate, but curve 202 has a higher quality metric value compared to curve 204. Also, at 206-2, curve 202 may have a lower bitrate than point 208-2 on curve 204 at the same quality metric value. The improved rate distortion performance can be seen using pre-processor 114 on curve 202. The following will describe how the improvement in quality using pre-processor 114 is achieved.

Encoding Pipeline

Figure 3:
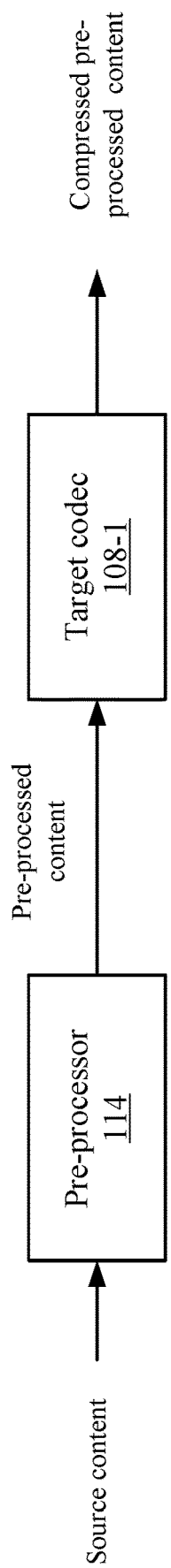
FIG. 3 depicts an example of the encoding pipeline according to some embodiments.

FIG. 3 depicts an example of the encoding pipeline according to some embodiments. Pre-processor 114 receives source content. For example, the source content may be high quality video (e.g., uncompressed video), but other types of content may be appreciated. Pre-processor 114 may pre-process the source content. As will be discussed in more detail below. Pre-processor 114 may be trained to pre-process source content to improve the quality of the decoded content compared to decoded content that was not pre-processed. For example, pre-processor 114 may include alterations to the source content, such as the alterations may add alterations on the source content to alleviate the distortion from a codec while keeping the bitrate around the original bitrate. In the process, pre-processor 114 outputs pre-processed content. Then, target codec 108-1 compresses the pre-processed video to output compressed pre-processed content. The compressed pre-processed content may be delivered to client device 104.

The parameters of pre-processor 114 may be optimized to improve the quality of decoded content, such as by minimizing distortion, such as compression artifacts, from decoded content, which improves the visual content that is displayed. That is, the decoded content from the compressed pre-processed content may be closer to the high quality source content compared with decoded content without pre-processing. Also, the decoded content from the compressed pre-processed content should have a bitrate that may also be similar to the decoded content without pre-processing. The training of pre-processor 114 is performed using a differentiable proxy codec, which will now be described.

Differentiable Proxy Codec

Figure 4:
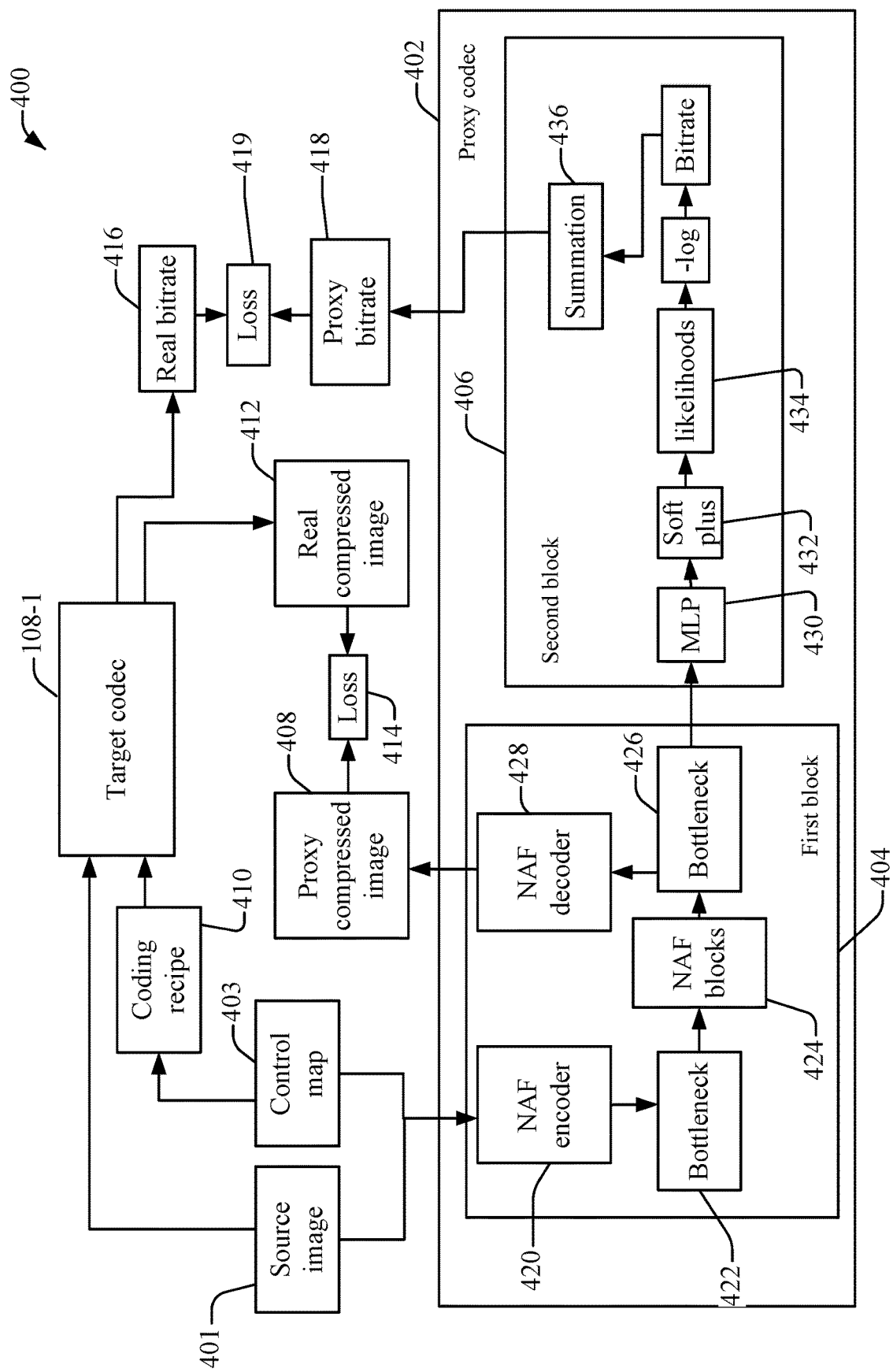
FIG. 4 depicts an example of a proxy codec according to some embodiments.

FIG. 4 depicts an example of a system 400 that includes proxy codec 402 and target codec 108-1 according to some embodiments. System 400 may be used to train proxy codec 402.

Proxy codec 402 may be differentiable by having adjustable parameters that are used to encode source content. For example, proxy codec 402 may be based on a neural network that can encode an image similarly to target codec 108-1 (e.g., generate similar distortion) to maintain a similar bitrate as an encoded image from target codec 108-1. In some embodiments, proxy codec 402 includes a neural network that includes parameters to output a proxy compressed image 408 and a proxy bitrate 418. The proxy bitrate may be a predicted bitrate of the proxy compressed image.

Proxy codec 402 includes a first block 404 that learns the encoding process of target codec 108-1 to generate a proxy compressed image 408. For example, first block 404 may learn the distortion that is introduced by target codec 108-1. Also, proxy codec 402 includes a second block 406 that predicts a proxy bitrate 418 of proxy compressed image 408, such as by learning an entropy model of target codec 108-1 to predict the proxy bitrate. In some embodiments, first block 404 includes a first portion of a neural network and second block 406 include a second portion of a neural network. First block 404 and second block 406 may also include separate neural networks. The parameters of the first portion of the neural network and the second portion of the neural network may be trained together or separately. The training process will now be described.

The following training process may be performed for multiple source images from source content. For discussion purposes, a source image 401 from source content is discussed, and the process described may be performed for multiple source images. When the term content is used, this may include a single image or multiple images. Also, a control map 403 may be used to configure the encoding process of proxy codec 402 and target codec 108-1. For example, the control map 403 may be used to determine a coding recipe at 410 that may define the configuration of target codec 108-1 to generate a compressed image. For example, N compressed images may be created using N configurations. Also, proxy codec 402 may generate M×N pre-processed images using M configurations from the control map 403. The configurations may specify different bitrates or resolutions to use when encoding source content.

First block 404 may output a proxy compressed image 408 and target codec 108-1 may output a real compressed image 412 without using pre-processing. Then, a loss is calculated at 414 by comparing the proxy compressed image 408 with the real compressed image 412. The loss may be based on measuring a difference of values for a metric between the proxy compressed image 408 and the real compressed image 412. The loss may be calculated for N real compressed images that are compared to M×N pre-processed compressed images. The loss for multiple comparisons of a real compressed image to M pre-processed compressed images may be used to train proxy codec 402. However, the discussion will discuss one proxy compressed image 408 and one real compressed image 412 being compared for discussion purposes.

Target codec 108-1 may also output a real bitrate at 416 that is the bitrate for real compressed image 412. Second block 406 of proxy codec 402 may learn an entropy model of target codec 108-1 to output a proxy bitrate at 418 that predicts the bitrate of proxy compressed image 408. The real bitrate may be compared with the proxy bitrate to determine a loss at 419.

In some embodiments, the explicit modeling of intra-coding and adaptive partitioning with differentiable operations is tough and unfriendly for parallel optimization. As a result, given the input image, a neural network that can generate the proxy compressed image and predict the proxy bitrate may be used. The output of the neural network may be formulated as:

$$\widehat{bpp}_p, \hat{I}_p = c_{\theta,\phi}^{proxy}(I, cp),$$

where I is the source image, $\hat{I}_p$ and $\widehat{bpp}_p$ are the compressed image and the bitrate predicted by the proxy codec 402, cp represents the coding parameters, θ represents the parameters for learning the distortion of target codec 108-1, and φ represents the parameters for learning the entropy model of target codec 108-1. In some embodiments, proxy codec 402 uses a convolutional network with up/down sampling as the encoder and the decoder instead of DCT and inverse DCT to mimic the complicated video compression distortion. Besides, the quantization and rounding are removed, and the coding recipes are fed to the neural network together with input images, serving as the control map. In such a manner, the neural network handles the sophisticated relationship between the coding recipe and outputs on its own implicitly.

In first block 404, the first portion of the neural network that is used may be different. In some embodiments, encoder block 420 and decoder block 428 may use a non-linear activation free (NAF) block or a Conv-ReLU-Conv block. For this example, non-linear activation free blocks are used as a first portion of a neural network that can be used to encode the source image to a proxy compressed image 408. A NAF encoder block 420 may be a sequence of NAF blocks that output latent features of the source image. First block 402 may add distortion via bottleneck 422, NAF blocks 424, and bottleneck 426. Bottleneck 422 may be the output of latent features from NAF encoder 420, NAF blocks 424 may add distortion to bottleneck 422, and bottleneck 426 may be the output of NAF blocks 424. Then, an NAF decoder 428 decodes the latent features from the bottleneck 426 into proxy compressed image 408. Parameters of components in first block 404 may be trained to adjust the distortion that is added to proxy compressed image 408.

Latent features from bottleneck 426 are also provided to second block 406. The latent features may be information that can be used to predict the proxy bitrate 418. In some embodiments, the second portion of the neural network may be used as a trainable entropy model. For example, a multi-layer perceptron (MLP) network 430 receives the features from bottleneck 426. A SoftPlus layer constrains the non-negative property of likelihoods at 432. The likelihoods are then regularized to a range of 0, 1 which results in bits at 434. The block −log may be used to compute the number of bits. For example, the block may use the function $I(E) = -\log_2(p(E))$, wherein the input from likelihoods 434 is p(E) and the Bitrate is I(E). The −log of the output is used to compute the number of bits for the bitrate according to the probability (frequency) of its components. A summation block at 436 summarizes the bits into a proxy bitrate 418.

Second block 406 may be formulated as follows:

$$\widehat{bits}_p = \sum_{b=0}^{B-1} -\log_2(E\phi(latentb)),$$

$$\widehat{bpp}_p = \frac{\widehat{bits}}{HW},$$

where $latent_b$ is the latent space, i.e., features at the neural network's bottleneck, $b \in [0, HW/scale^2)$ is the spatial index of 2D latent features, scale=8 is the down/up-sample factor of the encoder and decoder, and $\widehat{bitsp}$ represents the total number of bits of the patch with the spatial resolution of H×W. Second block 406 may apply the loss to the whole patch since the block sizes within the patch may not be identical. Block sizes may be square, rectangular, or other shapes. Moreover, the 3×3 convolutional layers and down-sampling can account for the spatial redundancy, i.e., intra-coding, so MLP 430 may be used instead of convolutional layers for entropy model to make the entropy map sharp.

The losses at 414 and 419 may be used to train the parameters of the neural network of proxy codec 402. For example, the parameters of first block 404 or the parameters of second block 406 may be trained based on the loss. In some embodiments, the parameters of first block 404 or second block 406 may be trained to minimize the loss between the proxy compressed image and the real compressed image or the loss between the real bitrate and the proxy bitrate. A loss $L_{distortion}$ is applied to the output of first block 402 and the pre-processed compressed image. Also, a loss $L_{bitrate}$ is applied to the proxy bitrate and the real bitrate. The losses can be formulated as follows:

$$\widehat{bpr}, \hat{I} = C^{target}(I, cp)$$

$$L_{total} = L_{distortion}(\hat{I}_p, \hat{I}) + L_{bitrate}(\widehat{bpr}_p, \widehat{bpr}),$$

where $C^{target}$ represents the target codec 108-1, and $\widehat{bpr}$ and $\hat{I}$ represent the real compressed image and the real bitrate output by target codec 108-1. The losses, such as both fidelity and perceptual, for $L_{distortion}$ and Mean Squared Error (MSE) loss for $L_{bitrate}$, which is formulated as follows:

$$L_{distortion}(\cdot, \cdot) = L_1(\cdot, \cdot) + L_{SSIM}(\cdot, \cdot) + L_{LPIPS}(\cdot, \cdot),$$

$$L_{bitrate} = MSE(\cdot, \cdot).$$

SSIM may be the metric for perceptual error. $L_1$ is an absolute error between two numbers and $L_{LPIPS}$ is the mean squared error between the deep features of two images. Other types of losses may also be used. The training of the parameters may attempt to minimize the losses for distortion and bitrate by adjusting the parameters of the neural network of proxy codec 402. Once trained, proxy codec 402 may output a proxy compressed image and a proxy bitrate for a source image that minimizes the loss between a real compressed image and a real bitrate, respectively.

Intra-Coding and Inter-Coding

Figure 5:
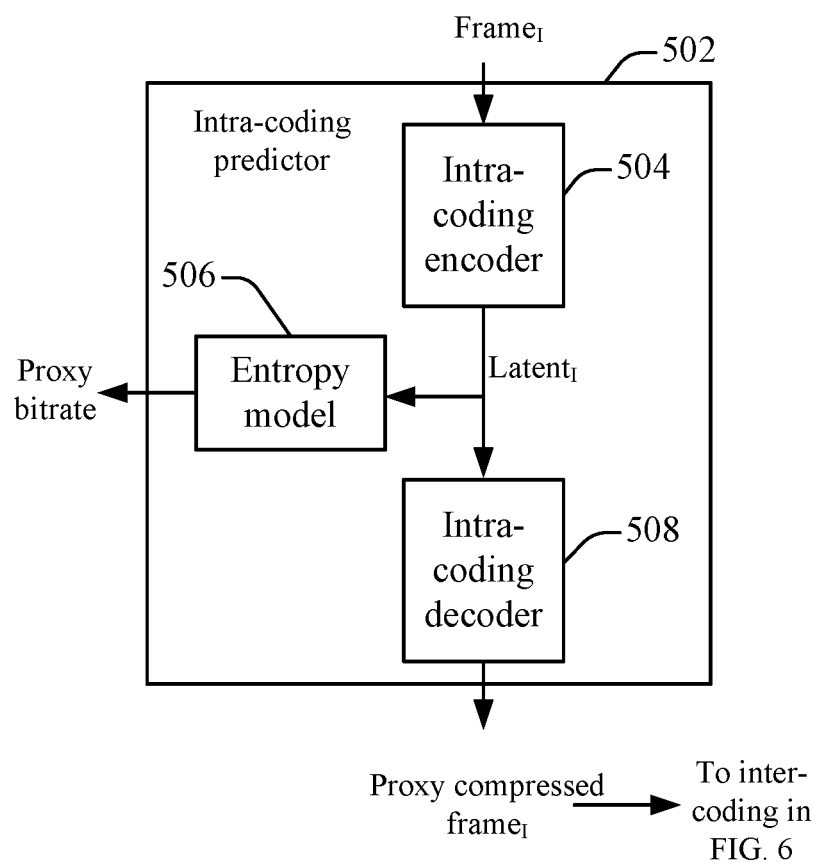
FIG. 5 depicts an example of an intra-coding predictor according to some embodiments.
Figure 6:
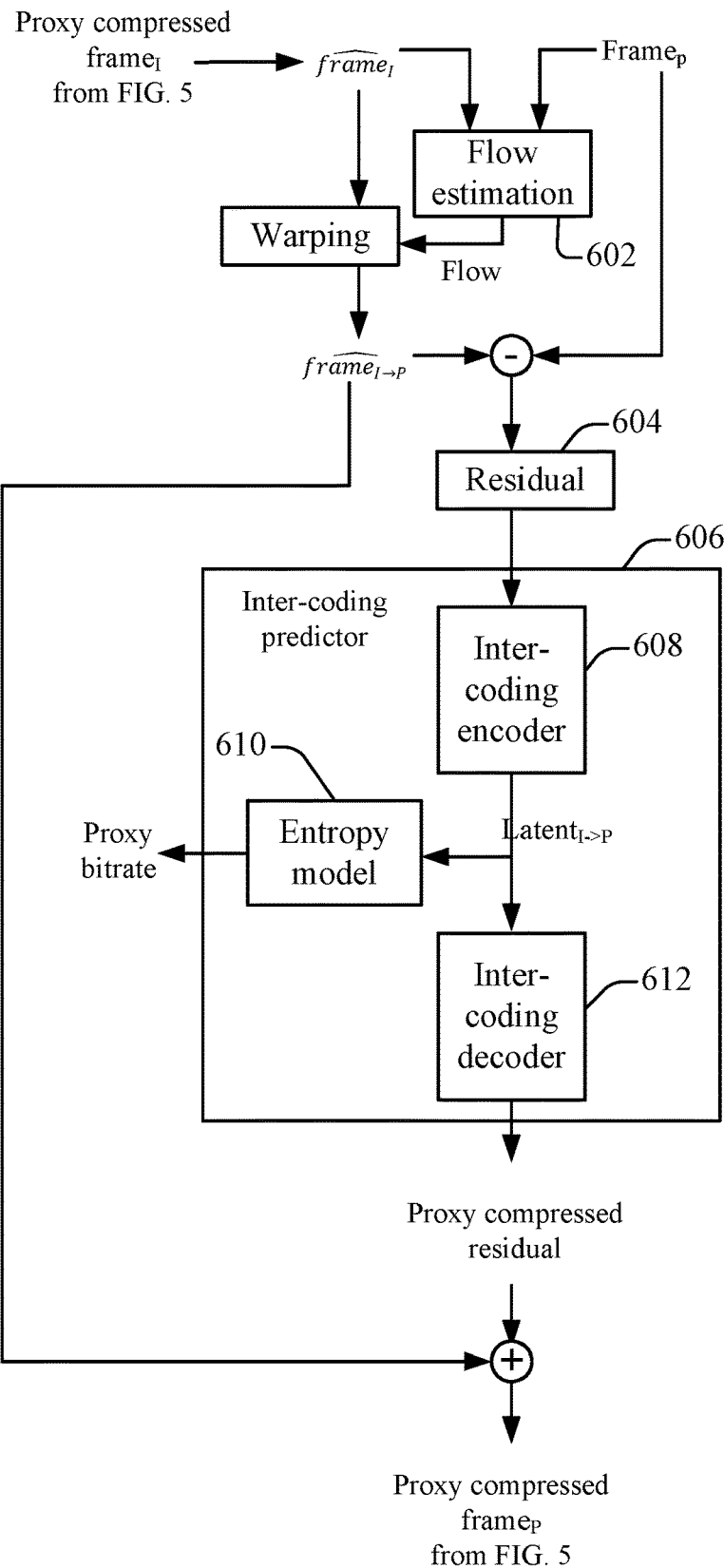
FIG. 6 depicts an example of an inter-coding predictor according to some embodiments.

Proxy codec 402 may model intra-coding and inter-coding. FIG. 5 and FIG. 6 depict an example of intra-coding and inter-coding systems, respectively, according to some embodiments. FIG. 5 depicts an example of an intra-coding predictor 502 according to some embodiments. Intra-coding predictor 502 receives an image frame$_I$ as a source image. An intra coding encoder 504 encodes the image into a latent representation latent$_I$. The latent representation is passed to an entropy model 506. Entropy model 506 outputs the proxy bitrate. After distortion is added to the latent representation, an intra-coding decoder 508 decodes the latent representation into a proxy compressed image that is output by intra-coding decoder 508. The proxy compressed image is then output to an inter coding predictor shown in FIG. 6.

FIG. 6 depicts an example of an inter-coding predictor 606 according to some embodiments. Referring to FIG. 6, the proxy compressed image f$\widehat{rame}_I$ from intra-coding is received. Motion vectors may be determined for inter-coding. A flow estimation block 602 compares a P frame frame$_P$ and the proxy compressed image f$\widehat{rame}_I$ to determine motion vectors between the frames for the flow. The proxy compressed image f$\widehat{rame}_I$ is warped to align pixels with the flow, which generates a warped proxy compressed image fr$\widehat{ame}_{I \to P}$. A residual is calculated at 604 between the P frame frame$_P$ and warped proxy compressed image fr$\widehat{ame}_{I \to P}$. The residual is input into an inter-coding predictor 606. An inter coding encoder 608 encodes the residual into a latent representation latent$_{I \to P}$. The latent representation is input into an entropy model 610, which outputs a proxy bitrate. After distortion is added to the latent representation, the latent representation is also input into an inter-coding decoder 612, which outputs a proxy compressed residual re$\widehat{sidu}$al. The proxy compressed residual is combined with the warped proxy compressed image fr$\widehat{ame}_{I \to P}$ to generate the proxy compressed image frame$_P$. An entropy model 610 also generates a proxy bitrate.

Training Process

The following will now describe the training process of pre-processor 114. After training of proxy codec 402, the parameters of proxy codec 402 may be frozen. Then, pre-processor 114 may be trained.

Figure 7:
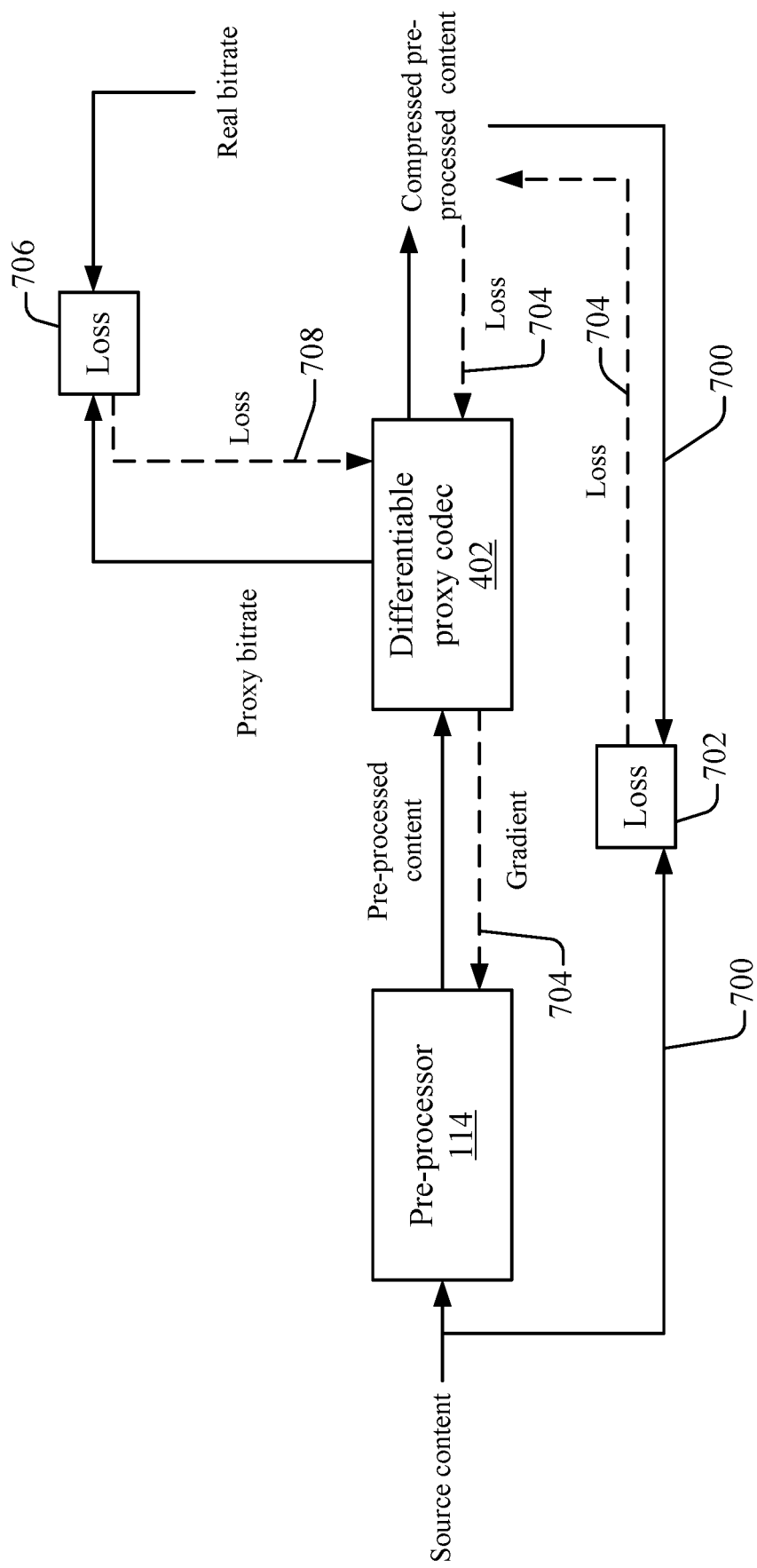
FIG. 7 depicts an example of training a pre-processor according to some embodiments.

FIG. 7 depicts an example of training pre-processor 114 according to some embodiments. A differentiable proxy codec 402 is used in the training process. As discussed above in FIG. 4, proxy codec 402 is trained to output compressed content that is similar to target codec 108-1. The parameters of proxy codec 402 may be frozen to train pre-processor 114. However, the parameters of proxy codec 402 may be used as a medium for backwards propagation of a gradient to update the parameters of pre-processor 114.

First, a forward propagation at 700 is used to generate a loss at 702 between the source content and the compressed pre-processed content. A back propagation is shown by the dotted lines at 704 from the loss calculation through differential proxy codec 402 to pre-processor 114. A loss may be used to determine a gradient of the parameters of proxy codec 402. The gradient may measure the change over time for the parameters of proxy codec 402. For example, the gradient may be based on an adjustment in the parameters of proxy codec 402 to minimize the loss. It is noted that the parameters of proxy codec 402 are not adjusted in this stage. Rather, adjusted parameter values for proxy codec 402 may be determined to minimize the loss. In the calculation, the frozen parameter values may be compared to adjusted parameter values to determine a gradient between the adjusted parameters and the frozen parameters of proxy codec 402. The gradient is back-propagated to pre-processor 114 and used to determine a change to the parameters of pre-processor 114. The parameters of pre-processor 114 may be adjusted to reduce the loss based on the gradient of the adjustment of parameters from proxy codec 402. In some embodiments, the compressed pre-processed image may be a function of the source image, the trained parameters of proxy codec 402, and the parameters of pre-processor 114 to be optimized. The source image and the trained parameters proxy codec 402 are known. The parameters of pre-processor 114 may be adjusted based on the gradient of the parameters of proxy codec 402.

The bitrate may also be adjusted similarly using a back propagation. At 706, a loss is calculated between the proxy bitrate output by proxy codec 402 and the real bitrate. The loss is back-propagated at 708 to proxy codec 402 and a gradient of the adjustment of the parameters of proxy codec 402 is determined to minimize the loss. The gradient from proxy codec 402 is back-propagated to pre-processor 114. The parameters of pre-processor 114 are then adjusted based on the gradient.

Figure 8:
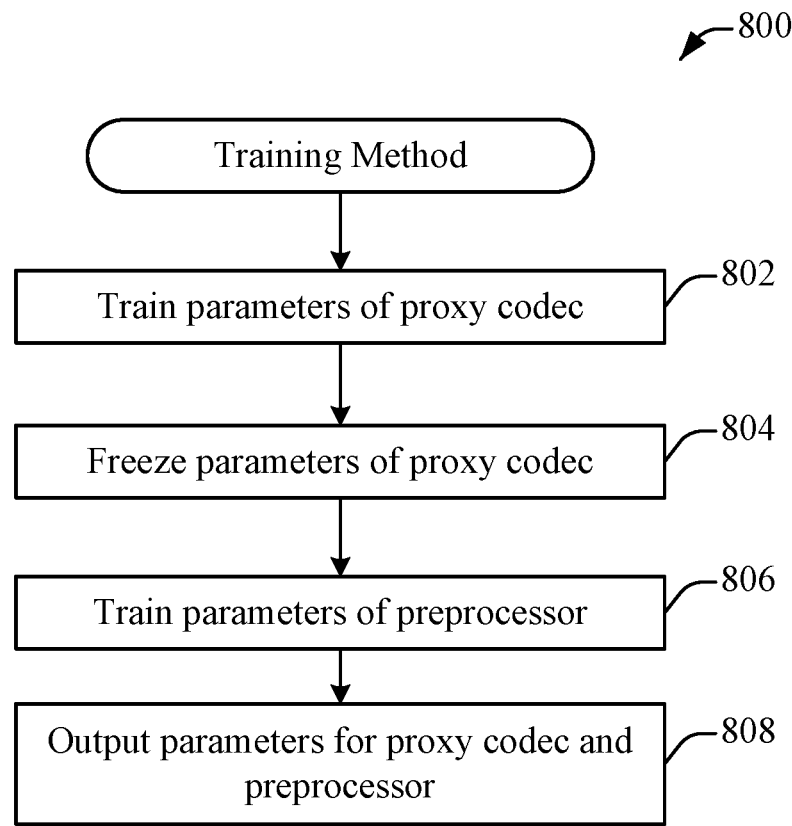
FIG. 8 depicts an overall method for training a proxy codec and a pre-processor according to some embodiments.

FIG. 8 depicts an overall method for training proxy codec 402 and pre-processor 114 according to some embodiments. At 802, the parameters of proxy codec 402 are trained. For example, the parameters are trained as discussed above with respect to FIG. 4 where the proxy compressed image and the real compressed image are compared to determine a loss, which is used to adjust the parameters of proxy codec 402. A loss from the proxy bitrate and the real bitrate is also used to train the parameters of proxy codec 402.

At 804, the parameters of the trained proxy codec 402 are frozen. That is, the parameters of proxy codec 402 are not changed to train pre-processor 114.

At 806, the parameters of pre-processor 114 are trained. As discussed above in FIG. 7, the loss between compressed pre-processed image and the source image may be back-propagated through a differentiable proxy codec 402 to pre-processor 114. The gradient of an adjustment of the parameters of proxy codec 402 may be used to adjust the parameters of pre-processor 114. For example, the parameters of pre-processor 114 may be adjusted to reduce the loss based on the gradient of the adjustment of parameters of proxy codec 402. The bitrate may also be used to determine a loss that was back-propagated through proxy codec 402 to pre-processor 114 to adjust the weights of pre-processor 114.

After training proxy codec 402 and pre-processor 114, at 808, the parameters for proxy codec 402 and the parameters for pre-processor 114 are output. Thereafter, pre-processor 114 may be used to output pre-processed content, which may be encoded by target codec 108 as described in FIG. 1. The compressed pre-processed content that is output by target codec 108-1 may be higher in quality compared to if pre-processing was not performed.

Network Architecture

Figure 9:
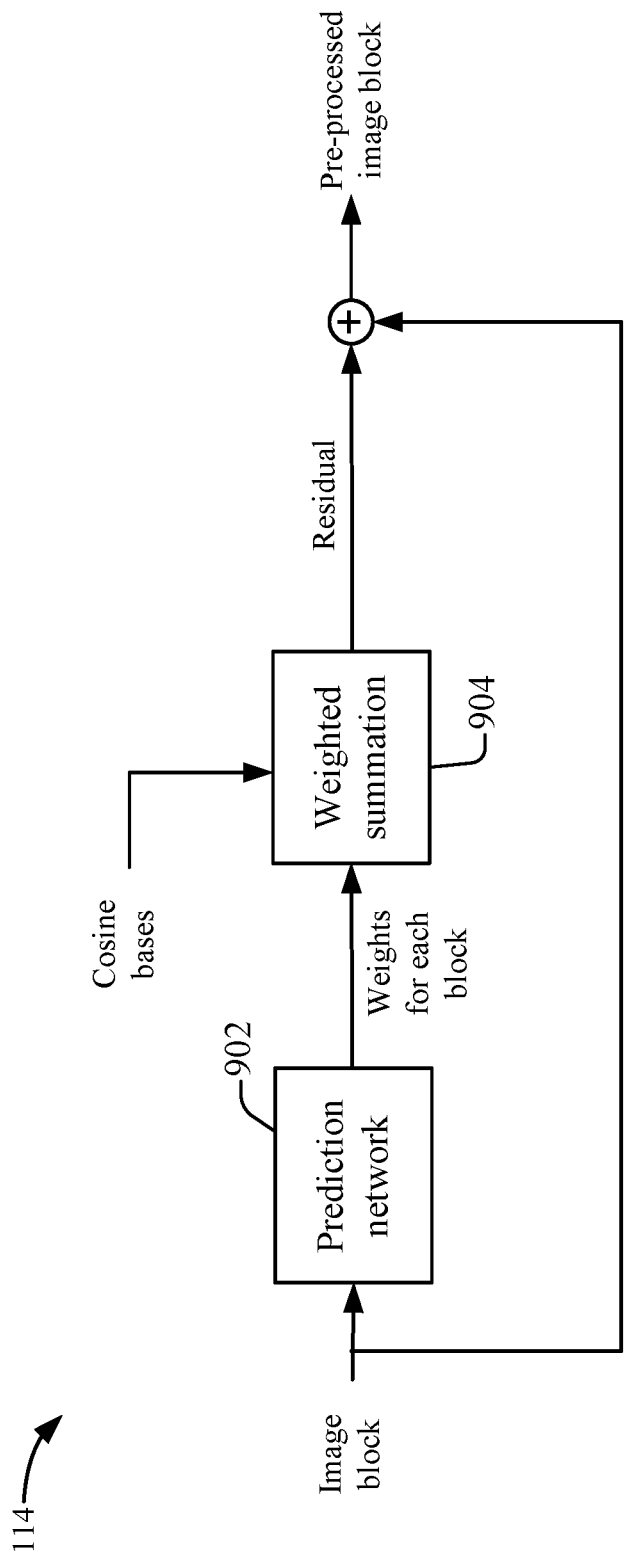
FIG. 9 depicts an example of constraining a search area of the pre-processor according to some embodiments.

The following will describe an example of an architecture of pre-processor 114 according to some embodiments. FIG. 9 depicts an example of constraining a search area of pre-processor 114 according to some embodiments. In some examples, the pre-processing performed by pre-processor 114, such as the added patterns to a source image, may not have achieved optimal pre-processed compressed images. For example, the patterns may have been out of the domain of the training data set, which may result in pre-processed compressed images and bitrates that did not improve the compression results.

In the process, a prediction network 902 may receive an image block from a source image. Prediction network 902 may add cosine bases as alterations to the source image. Prediction network 902 may predict the weights of cosine bases since an arbitrary 8×8 image block can be factorized to the weighted summation of 64 cosine bases. To prevent prediction network 902 from adding too much high frequency content, pre-processor 114 constrains the maximum magnitude of the weights. For example, high frequency cosine bases have much lower maximum magnitudes. A weighted summation at 904 may provide a weighted summation of 64 cosine bases. The size of the cosine bases may be set to 8×8, and the shape of the predicted weights for each red green blue (RGB) channel may be H/8×W/8×64, where H,W is the frame's original height and width. Other shapes may be used. Another intuition behind adding cosine bases is that the DCT is an invertible linear transformation. The addition of weighted cosine bases is equal to changing the DCT coefficients directly. The output of the weighted summation may be a residual, which is added to the input block. The output is a pre-processed compressed block.

Figure 10:
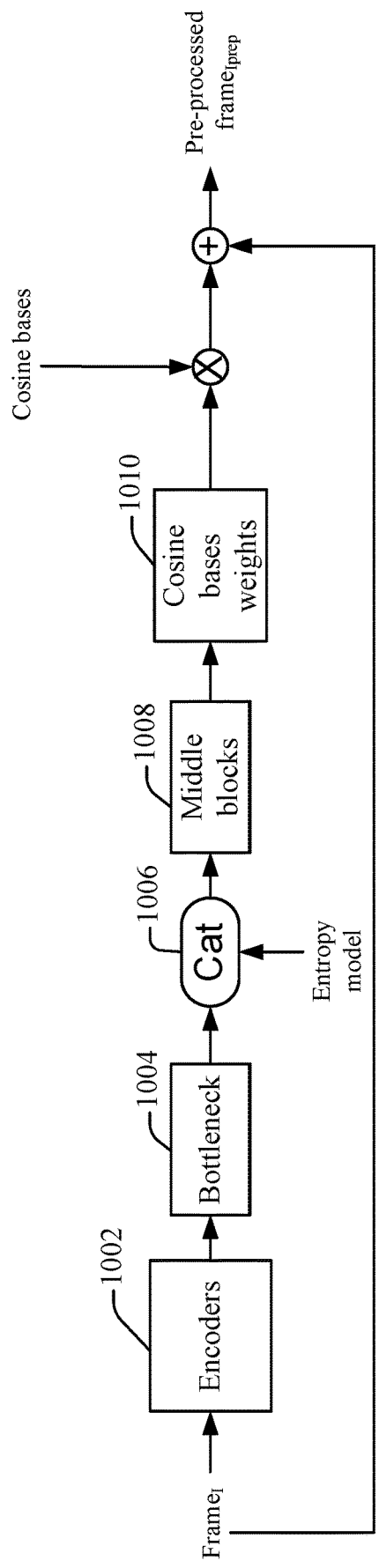
FIG. 10 depicts an example of the pre-processor according to some embodiments.

The neural network's architecture for predicting the cosine bases weights is shown in FIG. 10. FIG. 10 depicts an example of pre-processor 114 according to some embodiments. Encoders 1002 receive the source frame$_I$ and generate a latent representation. A bottleneck layer 1004 processes the latent representation. At 1006, the entropy map from proxy codec 402 is concatenated to the output of the bottleneck as guidance. The concatenated entropy map serves as the control information for pre-processor 114. Middle blocks 1008 process the output of the concatenation to further transform the latent space and entropy map to raw weights at 1010. Then, the raw weights are further multiplied by the corresponding maximum magnitude from the cosine bases. The input source image$_I$ is then added to the constrained weights to generate the pre-processed image block. Accordingly, the weighted cosine bases may be used to constrain the search area of pre-processor 114.

Conclusion

Accordingly, the use of a differential proxy codec 402 may allow for the training of pre-processor 114. The use of pre-processor 114 may improve the compressed content that is output by target codec 108. This improvement may be achieved without changing target codec 108-1 such as having to upgrade the standard used by target codec 108-1.

System

Figure 11:
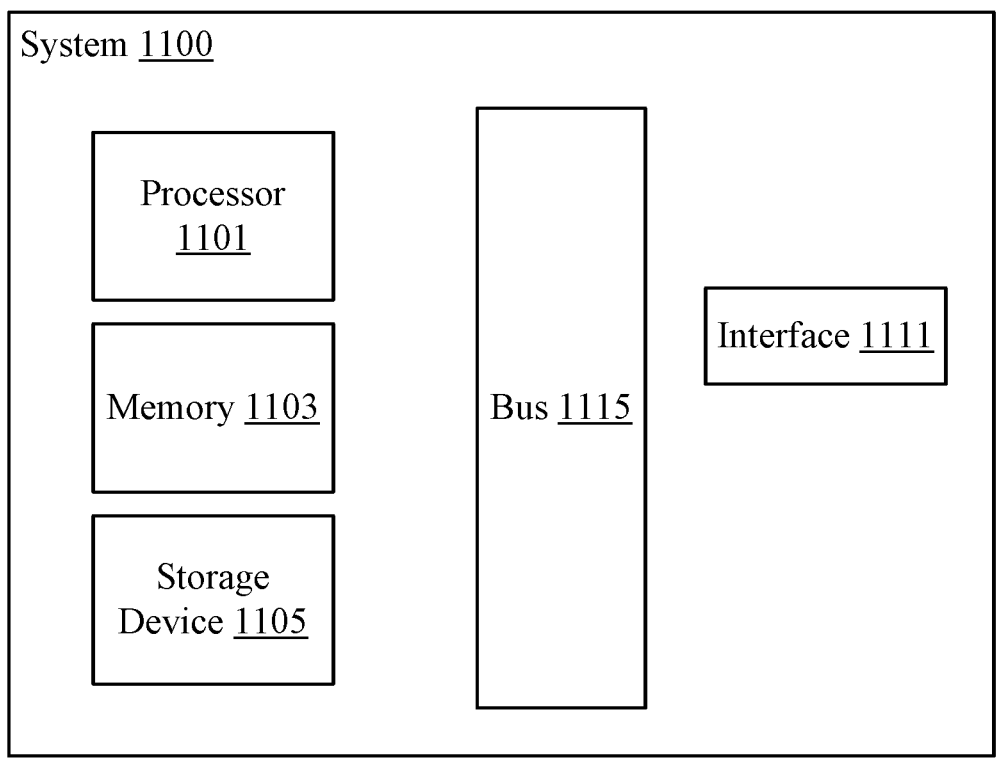
FIG. 11 illustrates one example of a computing device according to some embodiments.

FIG. 11 illustrates one example of a computing device according to some embodiments. According to various embodiments, a system 1100 suitable for implementing embodiments described herein includes a processor 1101, a memory module 1103, a storage device 1105, an interface 1111, and a bus 1115 (e.g., a PCI bus or other interconnection fabric.) System 1100 may operate as a variety of devices such as pre-processor 114, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. Memory 1103 may be random access memory (RAM) or other dynamic storage devices. Storage device 1105 may include a non-transitory computer-readable storage medium holding information, instructions, or some combination thereof, for example instructions that when executed by the processor 1101, cause processor 1101 to be configured or operable to perform one or more operations of a method as described herein. Bus 1115 or other communication components may support communication of information within system 1100. The interface 1111 may be connected to bus 1115 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    training a first parameter of a differentiable proxy codec to encode source content based on a first loss between first compressed source content and second compressed source content that is output by a target codec;
    pre-processing, by a pre-processor, a source image to output a pre-processed source image, the pre-processing being based on a second parameter;
    encoding, by the differentiable proxy codec, the pre-processed source image into a compressed pre-processed source image based on the first parameter;
    determining a second loss between the source image and the compressed pre-processed source image;
    determining an adjustment to the first parameter based on the second loss; and
    using the adjustment to adjust the second parameter of the pre-processor based on the second loss.

2. The method of claim 1, further comprising:
    determining a third loss between a first bitrate from encoding the source image by the differentiable proxy codec and a second bitrate from encoding the source image from the target codec;
    determining an adjustment to the first parameter based on the third loss; and
    using the adjustment to adjust the second parameter of the pre-processor based on the third loss.

3. The method of claim 1, wherein training the first parameter of the differentiable proxy codec comprises:
    processing, by the differentiable proxy codec, the source content to generate the first compressed source content;
    processing, by the target codec, the source content to generate the second compressed source content; and
    comparing the first compressed source content to the second compressed source content to determine the first loss.

4. The method of claim 3, wherein training the first parameter of the differentiable proxy codec comprises:
    adjusting the first parameter based on minimizing the first loss.

5. The method of claim 4, wherein training the first parameter of the differentiable proxy codec comprises:
    receiving information from processing the source content to generate the first compressed source content;
    processing the information to generate a first bitrate for the first compressed source content; and
    comparing the first bitrate to a second bitrate for the second compressed source content to determine a third loss.

6. The method of claim 5, wherein training the first parameter of the differentiable proxy codec comprises:
    adjusting the first parameter based on minimizing the third loss.

7. The method of claim 5, wherein the information is based on a latent representation from encoding the source content.

8. The method of claim 1, wherein the differentiable proxy codec includes a neural network that encodes the source content based on the first parameter.

9. The method of claim 8, wherein:
a first block of the neural network encodes the source content to generate the first compressed source content; and
a second block of the neural network predicts a first bitrate of the first compressed source content.

10. The method of claim 1, wherein the differentiable proxy codec:
encodes the pre-processed source image using intra-coding; and
encodes another pre-processed source image using inter-coding.

11. The method of claim 10, wherein:
the compressed pre-processed source image is received as a first compressed pre-processed source image;
a residual is determined based on a flow estimation between the compressed pre-processed source image and a second source image;
the residual is encoded by an inter-coding predictor; and
a second compressed pre-processed source image is generated using the residual and the first compressed pre-processed source image.

12. The method of claim 1, wherein the source image comprises a first source image, the method further comprising:
receiving a second source image;
pre-processing, by the pre-processor, the second source image to output a second pre-processed source image, the pre-processing being based on the second parameter that was adjusted; and
encoding, by the differentiable proxy codec, the second pre-processed source image into a second compressed pre-processed source image based on the first parameter.

13. The method of claim 1, wherein the first parameter is not adjusted using the adjustment to the first parameter when determining the adjustment to the second parameter.

14. The method of claim 1, wherein a search area of the pre-processor is constrained when adjusting the second parameter.

15. The method of claim 1, wherein the source content comprises first source content, the method further comprising:
receiving second source content;
pre-processing, by the pre-processor, the second source content to output pre-processed second source content, wherein the pre-processor includes the second parameter that was adjusted;
encoding the pre-processed second source content into compressed pre-processed second source content; and
outputting the compressed pre-processed second source content.

16. A non-transitory computer-readable storage medium having stored thereon computer executable instructions, which when executed by a computing device, cause the computing device to be operable for:
training a first parameter of a differentiable proxy codec to encode source content based on a first loss between first compressed source content and second compressed source content that is output by a target codec;
pre-processing, by a pre-processor, a source image to output a pre-processed source image, the pre-processing being based on a second parameter;
encoding, by the differentiable proxy codec, the pre-processed source image into a compressed pre-processed source image based on the first parameter;
determining a second loss between the source image and the compressed pre-processed source image;
determining an adjustment to the first parameter based on the second loss; and
using the adjustment to adjust the second parameter of the pre-processor based on the second loss.

17. An apparatus comprising:
one or more computer processors; and
a non-transitory computer-readable storage medium comprising instructions for controlling the one or more computer processors to be operable for:
training a first parameter of a differentiable proxy codec to encode source content based on a first loss between first compressed source content and second compressed source content that is output by a target codec;
pre-processing, by a pre-processor, a source image to output a pre-processed source image, the pre-processing being based on a second parameter;
encoding, by the differentiable proxy codec, the pre-processed source image into a compressed pre-processed source image based on the first parameter;
determining a second loss between the source image and the compressed pre-processed source image;
determining an adjustment to the first parameter based on the second loss; and
using the adjustment to adjust the second parameter of the pre-processor based on the second loss.

18. The apparatus of claim 17, further operable for:
determining a third loss between a first bitrate from encoding the source image by the differentiable proxy codec and a second bitrate from encoding the source image from the target codec;
determining an adjustment to the first parameter based on the third loss; and
using the adjustment to adjust the second parameter of the pre-processor based on the third loss.

19. The apparatus of claim 17, wherein training the first parameter of the differentiable proxy codec comprises:
processing, by the differentiable proxy codec, the source content to generate the first compressed source content;
processing, by the target codec, the source content to generate the second compressed source content; and
comparing the first compressed source content to the second compressed source content to determine the first loss.

* * * * *